US008267833B2

(12) United States Patent
Mueller et al.

(10) Patent No.: US 8,267,833 B2
(45) Date of Patent: Sep. 18, 2012

(54) HIGH EFFICIENCY TRANSFER CASE

(75) Inventors: Joseph G. Mueller, Clarkston, MI (US); Douglas O. Bradley, Sterling Heights, MI (US); Bradley R. Larkin, Shelby Township, MI (US)

(73) Assignee: MAGNA Powertrain of America, Inc., Troy, MI (US)

( * ) Notice: Subject to any disclaimer, the term of this patent is extended or adjusted under 35 U.S.C. 154(b) by 0 days.

(21) Appl. No.: 13/384,473

(22) PCT Filed: Sep. 21, 2011

(86) PCT No.: PCT/US2011/052562
§ 371 (c)(1),
(2), (4) Date: Jan. 17, 2012

(65) Prior Publication Data
US 2012/0178575 A1 Jul. 12, 2012

Related U.S. Application Data

(60) Provisional application No. 61/386,805, filed on Sep. 27, 2010.

(51) Int. Cl.
*F16H 3/44* (2006.01)
*F16H 37/02* (2006.01)
(52) U.S. Cl. ........................................ 475/302; 475/210
(58) Field of Classification Search ................. 475/210, 475/211, 212, 213, 222, 295, 296, 298, 302, 475/303; 74/665 F, 665 G, 665 GA, 665 GE; 192/93 R, 93 A, 96
See application file for complete search history.

(56) References Cited

U.S. PATENT DOCUMENTS

| | | | |
|---|---|---|---|
| 2,853,890 A | | 9/1958 | Kelbel |
| 5,226,860 A | * | 7/1993 | Baxter et al. ................... 475/206 |
| 5,330,030 A | | 7/1994 | Eastman et al. |
| 5,407,024 A | * | 4/1995 | Watson et al. ................ 180/248 |
| 5,499,951 A | * | 3/1996 | Showalter ...................... 475/204 |
| 5,584,776 A | * | 12/1996 | Weilant et al. ................ 475/213 |
| 6,766,889 B1 | * | 7/2004 | Pennycuff ......................... 192/35 |
| 7,425,183 B2 | * | 9/2008 | Kelley, Jr. ...................... 475/204 |
| 2002/0128113 A1 | * | 9/2002 | Tibbles ............................ 476/10 |
| 2007/0049451 A1 | | 3/2007 | Mizon et al. |

FOREIGN PATENT DOCUMENTS

WO   WO-2008/030340 A2   3/2008

* cited by examiner

*Primary Examiner* — Roger Pang
(74) *Attorney, Agent, or Firm* — Harness, Dickey & Pierce, P.L.C.

(57) ABSTRACT

A multi-speed power transmission device includes an input shaft, first and second output shafts and a planetary gearset. An axially moveable sleeve fixes the first output shaft and the input shaft for rotation when in a first position and the sleeve fixes the sun gear and the input shaft for rotation when in a second position. A hub is axially moveable and free to rotate relative to the first output shaft when in the first position. The hub is fixed for rotation with the first output shaft when in the second position. A cam plate is continuously fixed for rotation with the carrier and urges the hub toward its second position when in a second axial position. The input shaft drives the first output shaft at a reduced speed via the planetary gearset when the sleeve, hub and cam plate are at their second positions.

18 Claims, 10 Drawing Sheets

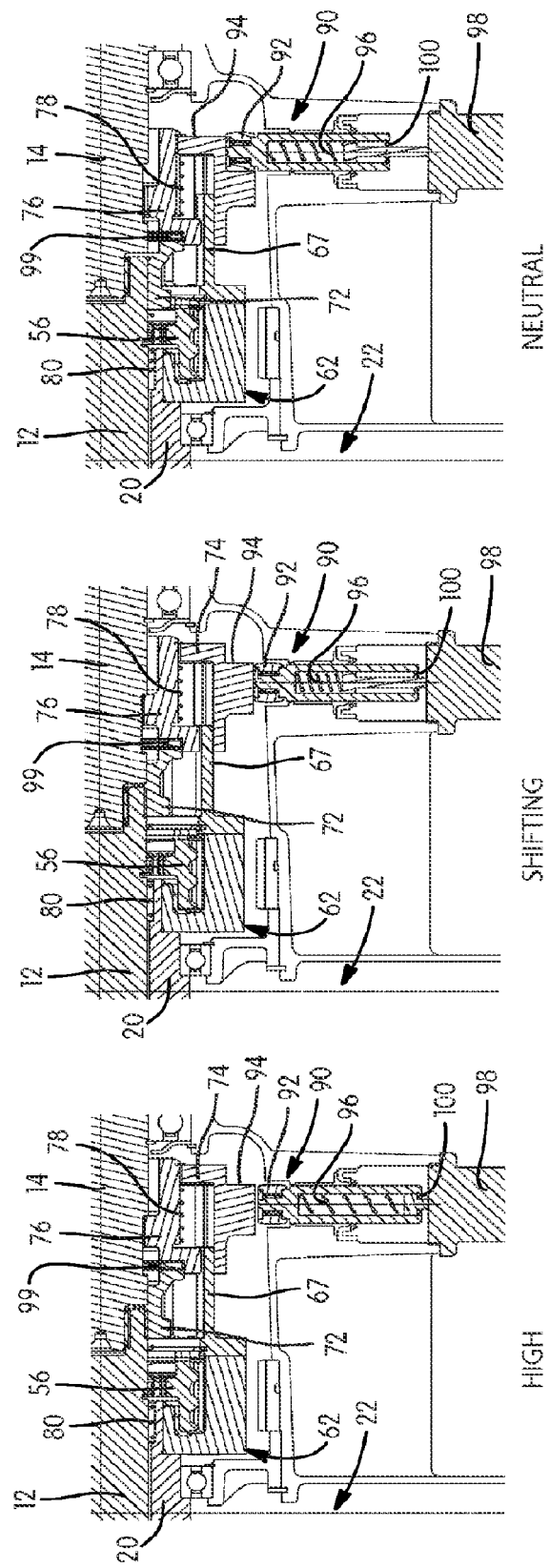

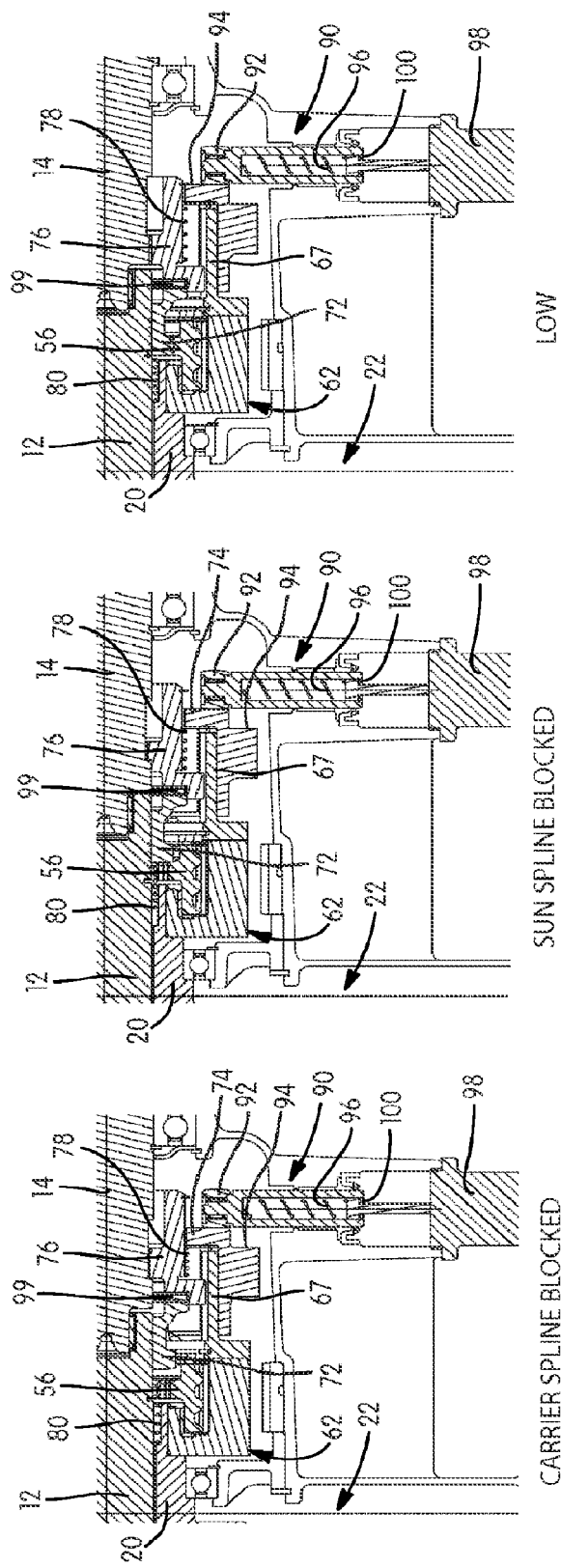

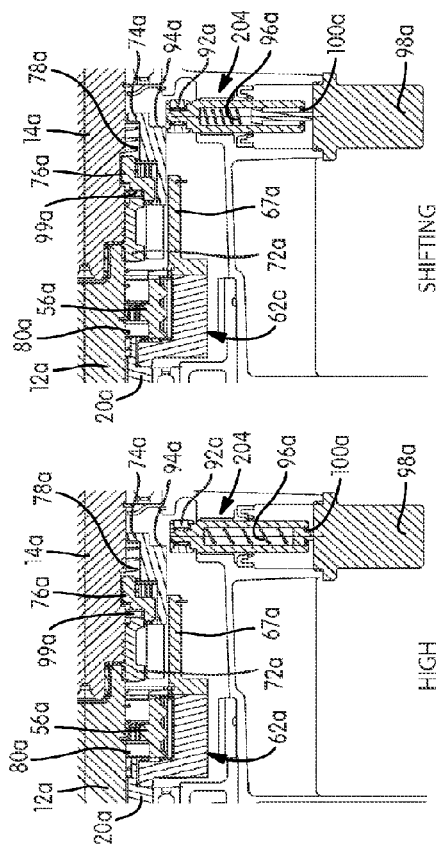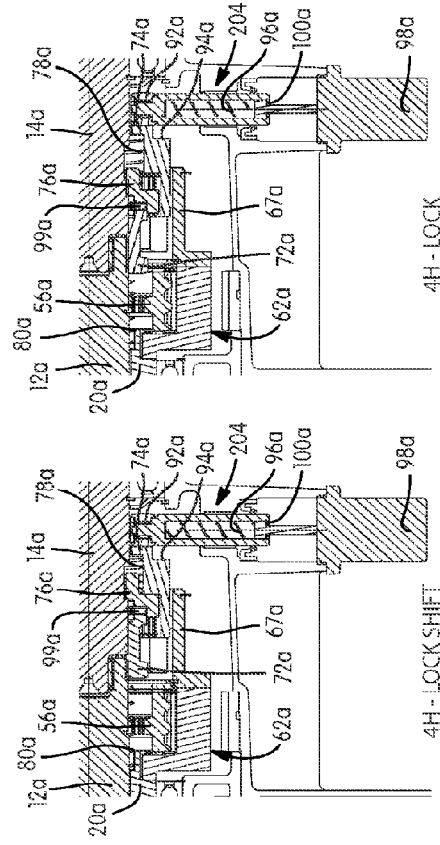

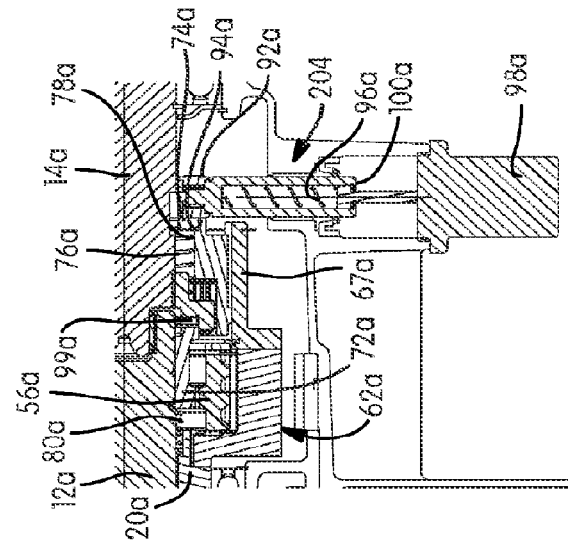
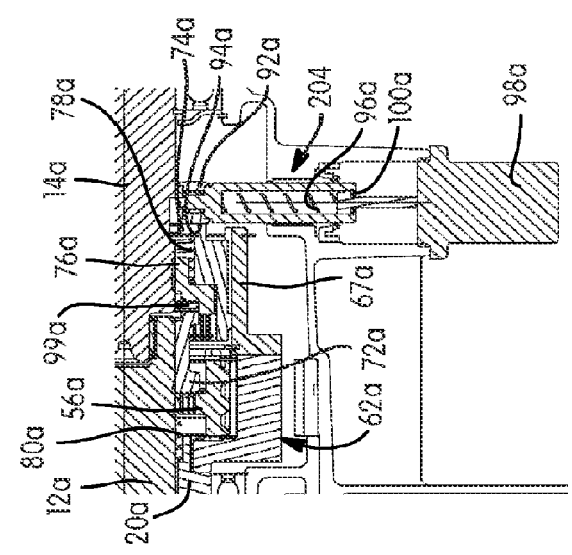
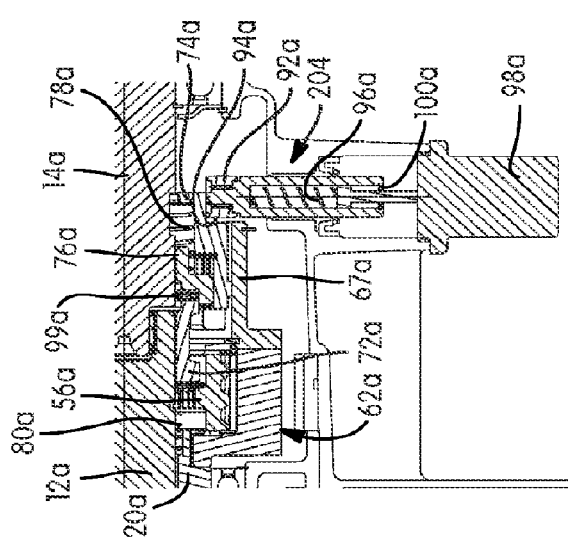

HIGH EFFICIENCY TRANSFER CASE

BACKGROUND

Vehicles have been equipped with power transfer devices such as transfer cases for many years. Typically, transfer cases allow operation of the vehicle in a two-wheel drive mode or a four-wheel drive mode. Some transfer cases also provide multi-speed functionality.

Over the years, original equipment manufacturers have struggled to provide low cost and energy efficient transfer cases. For example, most transfer cases include wet clutches which exhibit oil churning losses as well as lubrication pump losses. In addition, some actuation systems require a relatively high electrical current draw to activate range and mode shifting systems.

Some of the two-speed transfer cases are relatively complex requiring a large number of relatively expensive components to provide the desired functions. In the past, dedicated single-speed or multi-speed transfer cases either shared few components or a single-speed version occupied the same packaging volume as the multi-speed version. Accordingly, it may be desirable to provide an optimized transfer case having a modular design to meet single-speed or multi-speed applications while maximizing the efficiency of the transfer case by minimizing the energy losses during operation.

SUMMARY

This section provides a general summary of the disclosure, and is not a comprehensive disclosure of its full scope or all of its features.

A multi-speed power transmission device includes an input shaft, first and second output shafts and a planetary gearset. An axially moveable sleeve fixes the first output shaft and the input shaft for rotation when in a first position and sleeve fixes the sun gear and the input shaft for rotation when in a second position. A hub is axially moveable and free to rotate relative to the first output shaft when in the first position. The hub is fixed for rotation with the first output shaft when in the second position. A cam plate is continuously fixed for rotation with the carrier and urges the hub toward its second position when in a second axial position. The input shaft drives the first output shaft at a reduced speed via the planetary gearset when the sleeve, hub and cam plate are at their second positions.

A multi-speed power transmission device for a vehicle includes an input shaft, first and second output shafts and a planetary gearset. A sleeve is moveable to drivingly couple and decouple the sun gear with the input shaft. A cam plate is axially moveable between first and second positions. The cam plate is continuously fixed for rotation with the carrier and includes a helical cam surface that reacts an axial load such that rotation of the cam plate causes axial translation of the cam plate to control the sleeve position. The input shaft drives the first output shaft at a reduced speed via the planetary gearset when the cam plate is at its second position and the sleeve drivingly couples the sun gear to the input shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5A-5F are fragmentary sectional views depicting components of a range shift mechanism in positions corresponding to various operating modes;

FIGS. 8A-8G are fragmentary sectional views depicting components of a range shift mechanism in positions corresponding to various operating modes;

Corresponding reference numerals indicate corresponding parts throughout the several views of the drawings.

DETAILED DESCRIPTION

Figure 1:
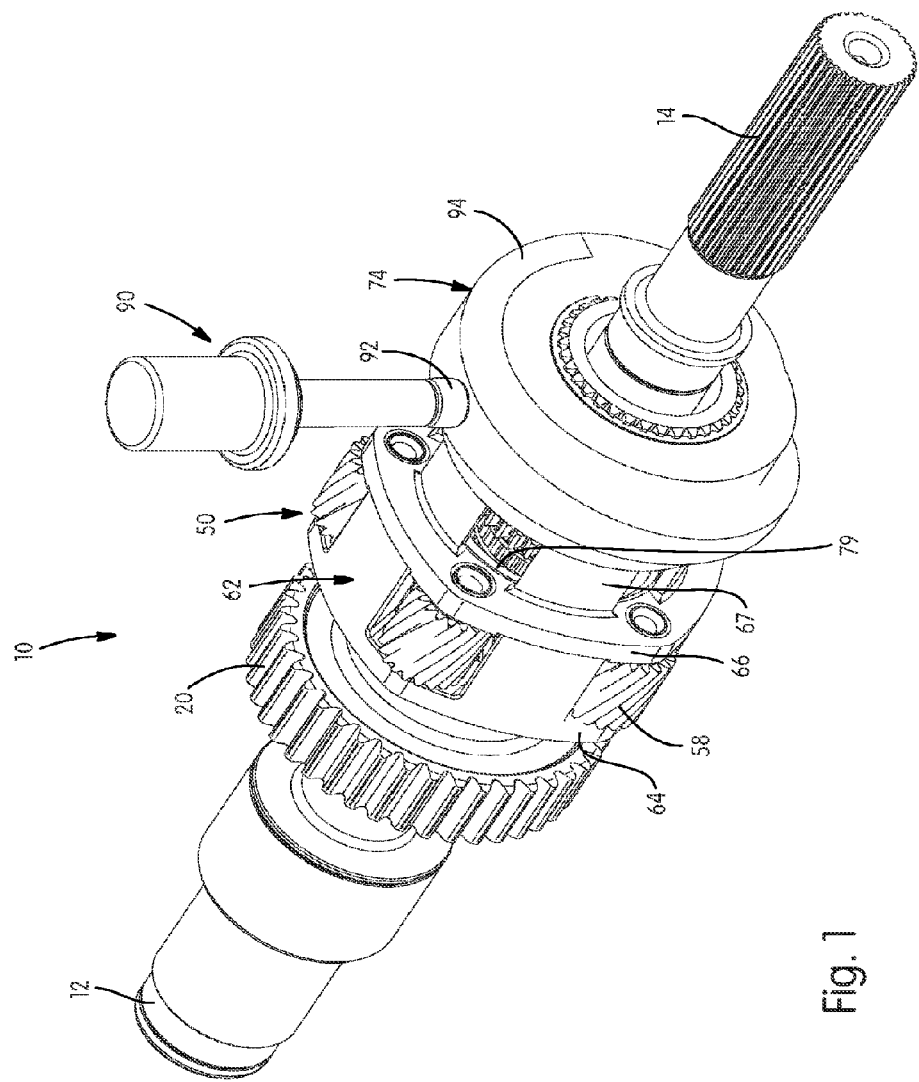
FIG. 1 is a fragmentary perspective view of a portion of a high efficiency transfer case constructed in accordance with the teachings of the present disclosure.

Example embodiments will now be described more fully with reference to the accompanying drawings.

FIGS. 1-5F depict a two-speed transfer case 10 having an input shaft 12, a first output shaft 14 and a second output shaft 16. A dry multi-plate clutch 18 selectively interconnects input shaft 12 with a drive sprocket 20 of a power transfer mechanism 22. Power transfer mechanism 22 also includes a driven sprocket 24 fixed for rotation with second output shaft 16. A flexible drive member or chain 26 drivingly interconnects drive sprocket 20 with driven sprocket 24. Directly intermeshed gears may alternatively be used.

Clutch 18 includes a drum 30 fixed for rotation with drive sprocket 20. A plurality of outer clutch plates 32 are fixed for rotation with and are axially moveable relative to drum 30. A hub 34 is integrally formed with input shaft 12. A plurality of inner clutch plates 36 are fixed for rotation with and are axially moveable relative to hub 34. An apply plate 38 is in splined engagement with input shaft 12 and is axially moveable to compress inner clutch plates 36 into engagement with outer clutch plates 32 and transfer torque across clutch 18. A coil 40 is selectively energizable to produce a magnetic field to attract an armature 42. Armature 42 is fixed with apply plate 38 such that energizing coil 40 controls the magnitude of torque transferred across clutch 18. Bearings 28 and 31 rotatably support drum 30 and drive sprocket 20 within a housing assembly 33.

A planetary gearset 50 is operable to transfer torque from input shaft 12 to first output shaft 14 and drive sprocket 20 at a direct drive ratio of 1:1 or a reduced drive ratio providing a torque multiplication. Planetary gearset 50 includes an annulus 52 fixed to a rear housing 54, a sun gear 56 and a plurality of pinion gears 58 in constant mesh with annulus 52 and sun gear 56. Each of pinion gears 58 are supported for rotation on a pinion pin 60 that forms a portion of a carrier 62. Carrier 62 includes a front carrier plate 64 fixed for rotation with drive sprocket 20 and a rear carrier plate 66. Rear carrier plate 66 includes a plurality of circumferentially spaced apart and axially extending lugs 67.

A range shift mechanism 70 is operable to place transfer case 10 in one of a reduced output shaft speed or low mode, a neutral mode or a high mode of operation. Range shift mechanism 70 includes a sleeve 72 movable to selectively drivingly interconnect input shaft 12 and first output shaft 14. A two-wheel drive high mode of operation may be provided by placing clutch 18 in an open, non-torque transferring mode and positioning sleeve 72 as shown in FIG. 5A and identified as "HIGH." All planetary gearset components are stationary at this time.

Figure 2:
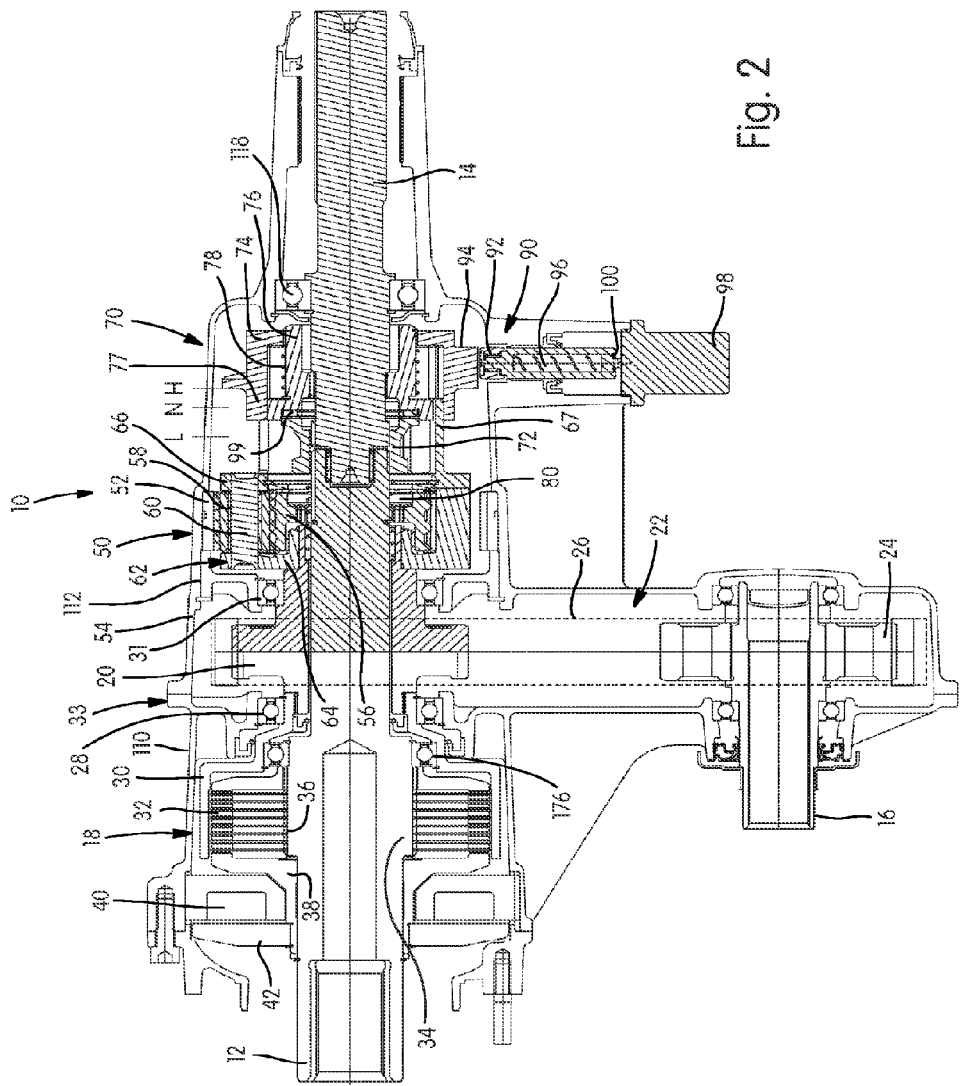
FIG. 2 is a cross-sectional side view taken through the transfer case.
Figure 3:
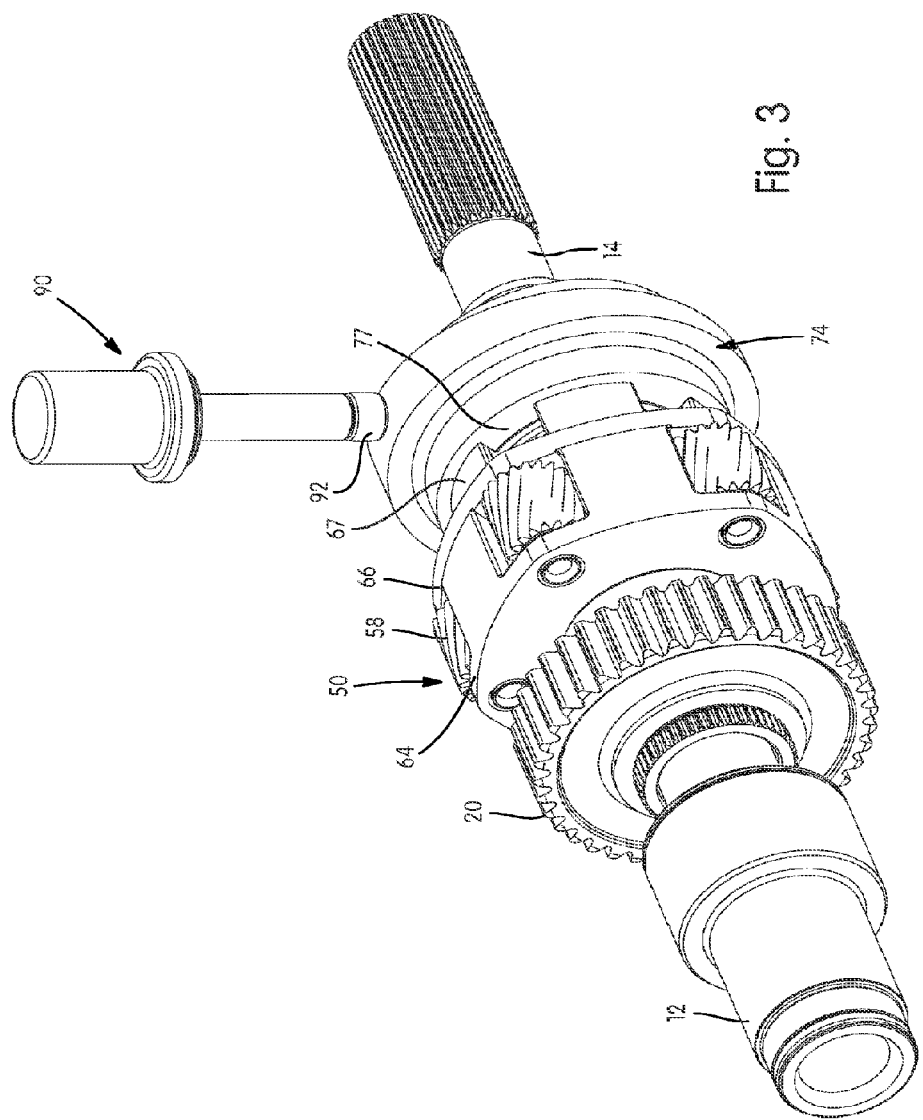
FIG. 3 is a fragmentary perspective view of a portion of the transfer case depicted in the previous Figures.
Figure 4:
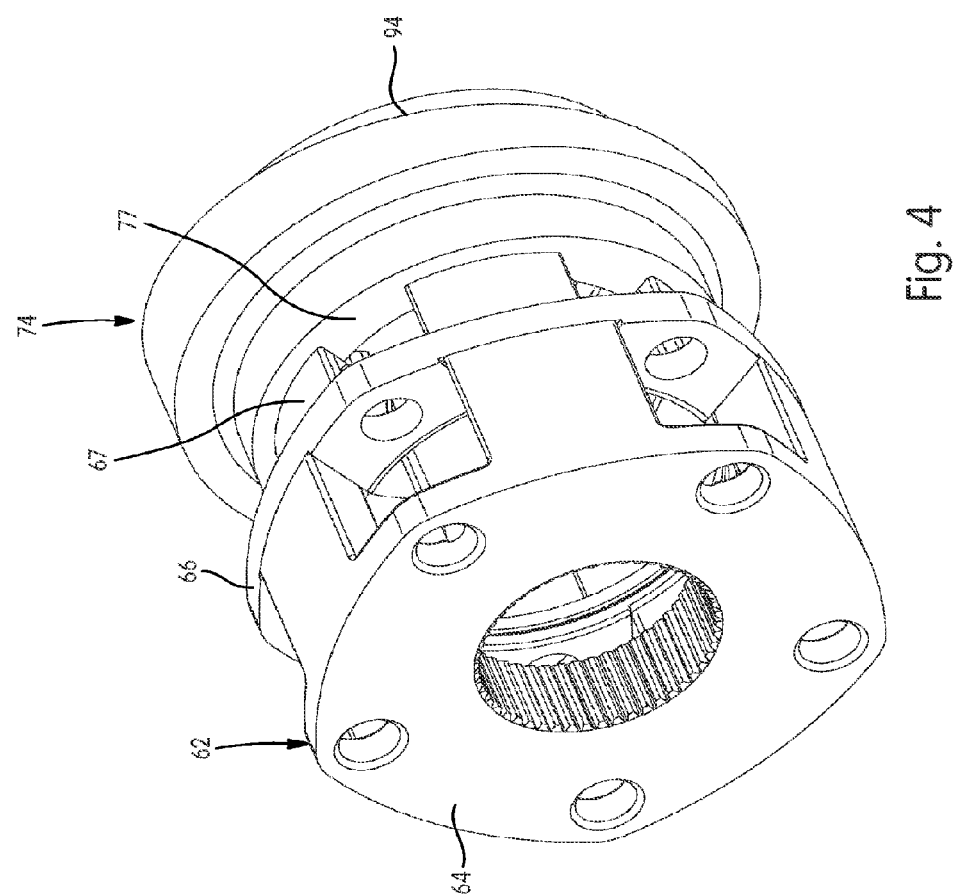
FIG. 4 is fragmentary perspective view of a carrier and a rotary cam.

Range shift mechanism 70 includes a rotary cam 74 splined on a hub 76. Rotary cam 74 includes a plurality of radially inwardly extending lugs 77 drivingly engaged with carrier lugs 67. A cam spring 78 urges cam 74 to the right as shown in FIG. 2. A retaining ring 79 restricts lugs 77 from disengaging lugs 67. A return spring 80 urges sleeve 72 toward the right as shown in FIG. 2.

A range actuator 90 includes a cam follower 92 selectively engageable with a cam surface 94 of rotary cam 74. A solenoid 98 drives a pin 100 to translate cam follower 92. A spring 96 allows relative axial movement between pin 100 and cam follower 92. Rotation of cam 74 causes axial translation of cam 74 and provides range shaft control, as will be described.

Based on the relative position of the components previously described, it should be appreciated that sun gear 56 may be selectively connected and disconnected with input shaft 12. Carrier 62 may be selectively coupled and decoupled for rotation with first output shaft 14. When sun gear 56 is disconnected from input shaft 12, a ratio of 1:1 is produced between the input shaft and output shafts. When sun gear 56 is drivingly connected to input shaft 12 and carrier 62 is drivingly coupled with first output shaft 14, a ratio of approximately 2.7:1 is achieved between the input and output shafts. Other ratios are also contemplated.

When transfer case 10 is operating in the two-wheel drive high mode of operation depicted in FIG. 5A, it should be appreciated that an active all-wheel drive mode is also available. During this mode, clutch 18 is modulated to send torque to second output shaft 16 via drive sprocket 20. When clutch 18 is activated, planetary gearset 50 rotates but does not transmit torque.

To achieve a high range mode of operation, range shift mechanism 70 activates coil 40 to cause torque to be transferred from input shaft 12 through clutch 18, drum 30, drive sprocket 20 and provide input to carrier 62. In this manner, the energy for the shift is provided by the vehicle driveline and not a separate actuator. Coil 40 is activated during the shift so that the components rotate as the vehicle is driven in a forward direction. Clutch 18 is deactivated once the shift is complete. Solenoid 98 is actuated but only a low current is required to axially translate cam 74 to the "H" position. At the "H" position, sleeve 72 couples input shaft 12 and first output shaft 14. Carrier 62 is fixed for rotation with first output shaft 14. Torque is also transferred through carrier 62 to drive sprocket 20.

FIGS. 5B and 5C labeled "SHIFTING" and "NEUTRAL", respectively, depict a shift from the high range to a neutral mode of operation. When neutral is selected, range shift mechanism 70 activates solenoid 98 to cause cam follower 92 to engage rotary cam 74. Depending on the rotational position of cam 74, follower 92 may be restricted from accessing cam surface 94. If so, spring 96 compresses as shown in FIG. 5B. As the vehicle moves, cam 74 rotates allowing follower 92 to engage cam surface 94. The energy supplied from the vehicle driveline continues to drive rotary cam 74 thereby causing cam 74 to move axially to the neutral position and translate hub 76 and sleeve 72 to disengage sleeve 72 from first output shaft 14. An axial thrust bearing 99 is positioned between hub 76 and sleeve 72. Coil 40 is also deactivated producing a four-wheel drive neutral position. During the neutral mode of operation, the internal combustion engine may continue to run without causing vehicle motion. Alternatively, the vehicle may be towed without back-driving the transmission.

A low range mode may be obtained by activating solenoid 98 and causing the shift system components to move to the positions identified in FIGS. 5D, 5E and 5F entitled "CARRIER SPLINE BLOCKED", "SUN SPLINE BLOCKED", and "LOW." To shift to the low range mode, coil 40 is activated during the shift so that the components rotate as the vehicle is driven in the forward direction. Clutch 18 is opened once the shift is complete. Rotation of rotary cam 74 causes simultaneous axial translation of cam 74 when cam follower 92 engages cam surface 94 as depicted in FIGS. 5D, 5E and 5F. It should be appreciated that the full axial extent of translation from cam 74 occurs regardless of whether a carrier spline blocking condition or a sun spline blocking condition exists. If a carrier spline engagement is blocked, as depicted in FIG. 5D, spring 78 compresses to load hub 76 toward the left as viewed in the Figure. Once the blocking condition has cleared, the internal spline formed on hub 76 drivingly engages an external spline formed on first output shaft 14.

FIG. 5E depicts a condition where the splined engagement between sun gear 56 and sleeve 72 is blocked. At this time, spring 80 is compressed. Once the blocking condition clears, sun gear 56 and sleeve 72 are fixed for rotation with one another as well as hub 76 and first output shaft 14.

Figure 6:
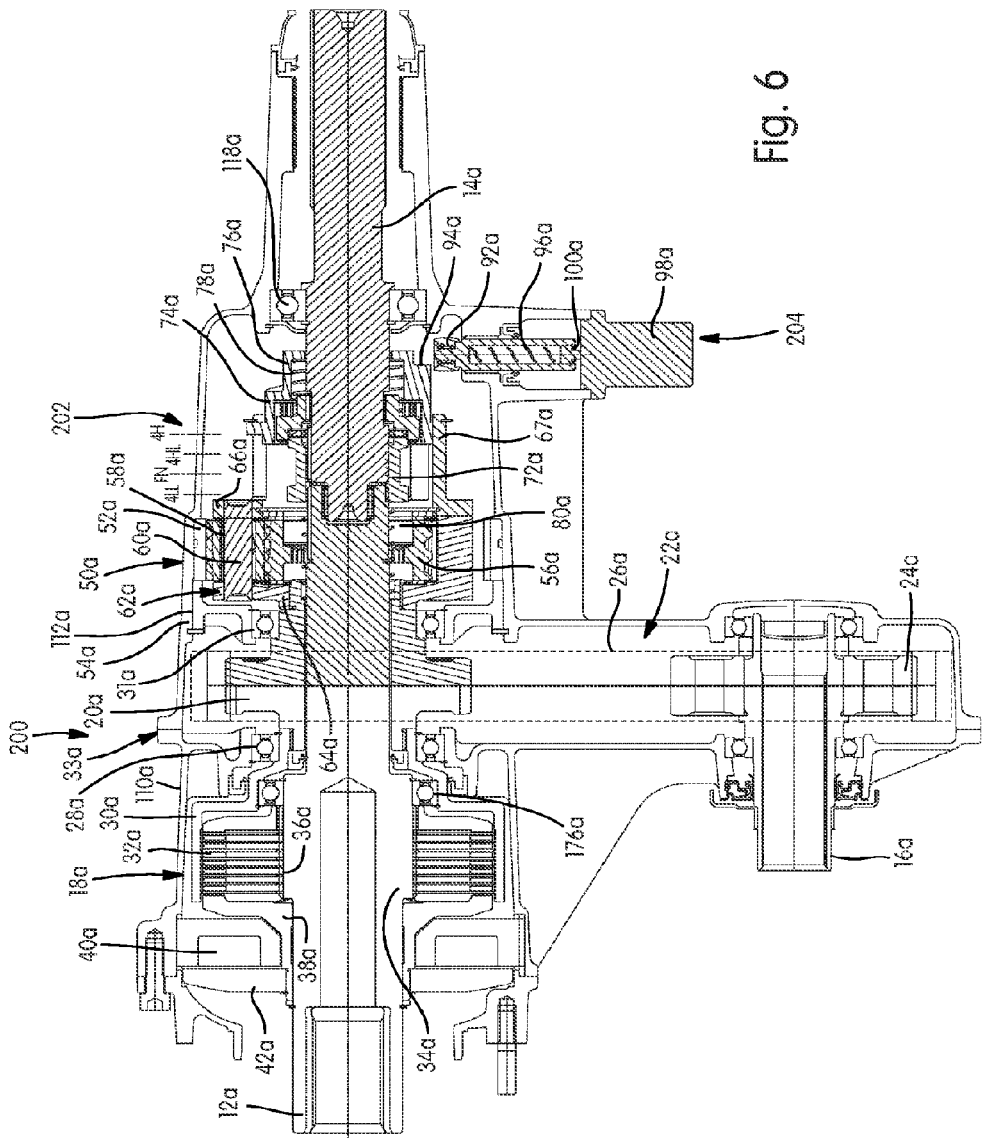
FIG. 6 is a cross-sectional view taken through an alternate transfer case.
Figure 7:
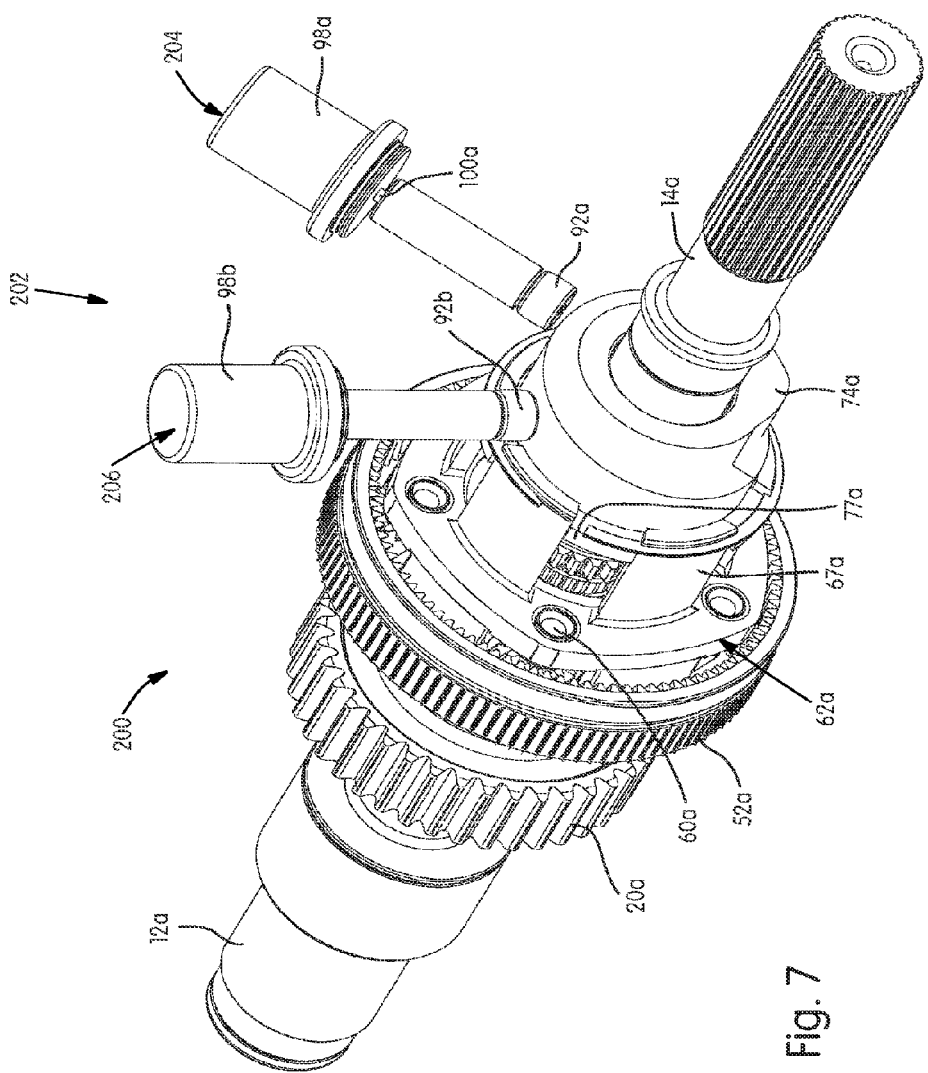
FIG. 7 is a fragmentary perspective view of a portion of the transfer case shown in FIG. 6.

An alternate transfer case 200 is depicted at FIGS. 6-8. Transfer case 200 is substantially similar to transfer case 10. As such, similar elements will be identified with like numerals include a lower "a" suffix. Transfer case 200 provides additional modes of operation over and above those previously described in relation to transfer case 10. In particular, transfer case 200 is operable to provide a four-wheel drive locked low range of operation, a neutral mode, a four-wheel drive high locked mode, and a high range mode of operation that may operate as a two-wheel drive or an adaptively controlled four-wheel drive high mode.

Transfer case 200 includes a range shift mechanism 202 where the energy for shifting is supplied by the kinetic energy of the vehicle as previously described in relation to transfer case 10. Shift mechanism 202 includes a first linear actuator assembly 204 and second linear actuator assembly 206. Each of the linear actuators is configured substantially similarly to range actuator 90. As such, the elements will be identified as before with "a" suffix elements relating to linear actuator assembly 204 and "b" suffix elements relating to linear actuator assembly 206.

First linear actuator assembly 204 is axially positioned at substantially the same location as range actuator 90 previously described. Second linear actuator assembly 206 is axially positioned closer to drive sprocket 20a than first linear actuator assembly 204. By configuring the actuators in this matter, the magnitude of axial translation experienced by cam 74a is doubled. The additional linear travel allows for additional modes of transfer case operation.

With reference to FIGS. 8A-8G, various operating modes of transfer case 200 are depicted. At FIG. 8A, a high-range mode of operation includes drivingly interconnecting input shaft 12a with first output shaft 14a via sleeve 72a. FIGS. 8B and 8C show a shift from the high range mode to a four-wheel drive high lock mode of operation at FIG. 8D. The shift is initiated as previously described where actuation of solenoid 98a and engagement of cam follower 92a with cam face 94a causes axial translation of rotary cam 74a to the position depicted in FIG. 8C. If the splined interconnection between first output shaft 14a and hub 76a is blocked, spring 78a compresses. Once the blocking condition clears, hub 76a translates towards the left side of the Figure to fix first output shaft 14a for rotation with hub 76a. At this time, input shaft 12a and first output shaft 14a remain fixed for rotation with one another via sleeve 72a. Carrier lugs 67a engage rotary cam lugs 77a to provide a torque transferring interconnection. Hub 76a is in splined engagement with rotary cam 74a to fix drive sprocket 20a for rotation with first output shaft 14a.

A neutral mode of operation may be obtained by energizing second solenoid 98b and causing rotary cam 74a to rotate and translate to the position depicted in FIG. 8E. At this time, sleeve 72a disengages first output shaft 14a to interrupt the torque path.

FIGS. 8F and 8G relate to shifting from the neutral position to a four-wheel drive lock mode. Second solenoid 98b is energized to engage rotary cam face 94a and cause rotary cam 74a to translate further to the left as depicted in FIG. 8F. If the splined interconnection between sun gear 56a and sleeve 72a is momentarily blocked, spring 78a compresses. Once the blocking condition is cleared, a splined interconnection exists between sleeve 72a and sun gear 56a. Spring 80a is fully compressed at this time. Torque provided to input shaft 12a is multiplied via planetary gearset 50a and transferred to first output shaft 14a, via rear carrier plate 66a, rotary cam 74a, and hub 76a. As previously mentioned, carrier 62a is fixed for rotation with drive sprocket 20a to transfer the output of planetary gearset 50a to second output shaft 16a. Torque flows from input shaft 12a through sun gear 56a, planetary pinions 58a, carrier 62a, hub 76a and is provided to first output shaft 14a and second output shaft 16a.

Housing assembly 33 is a transmission adapted to mount to a variety of transmissions. A front housing 110 supports coil 40 and second output shaft 16. A bearing support plate 112 captures the chain loads and the annulus thrust loads. Rear housing 54 supports first output shaft 14. A lubrication system contains a passive lubrication system that pulls oil from a sump via the chain 26 when rotating to lubricate the appropriate bearings and seals. The entire input cavity containing clutch 18 is dry and contains a seal and a bearing 116. A rear output bearing 118, bushing and seal are lubricated via an elevated sump created by an oil dam at the rear output bearing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-speed power transmission device for a vehicle, comprising:
    an input shaft;
    first and second output shafts;
    a planetary gearset including a carrier, a sun gear, a ring gear, and a pinion gear meshed with the sun and ring gears;
    a sleeve axially moveable between first and second positions, the sleeve fixing the first output shaft and the input shaft for rotation when in the first position, the sleeve fixing the sun gear and the input shaft for rotation when in the second position;
    a hub axially moveable between first and second positions, the hub being free to rotate relative to the first output shaft when in the first position, and being fixed for rotation with the first output shaft when in the second position;
    a cam plate axially moveable between first and second positions, the cam plate being continuously fixed for rotation with the carrier and urging the hub toward its second position when in the second position, wherein the input shaft drives the first output shaft at a reduced speed via the planetary gearset when the sleeve, hub and cam plate are at their second positions.

2. The transmission device of claim 1, further including an actuator urging the cam plate toward its second position.

3. The transmission device of claim 2, wherein the cam plate includes a helical cam surface engaged by the actuator such that rotation of the cam plate causes concurrent axial movement of the cam plate.

4. The transmission device of claim 3, further including a spring urging the hub toward the second position when the cam plate is in the second position, wherein the sleeve and hub need not be in the second position to allow the cam plate into the second position.

5. The transmission device of claim 4, wherein the actuator includes a solenoid for translating a cam follower into and out of engagement with the cam plate.

6. The transmission device of claim 5, further including another actuator axially offset from the actuator to cause additional axial translation of the cam plate to a third position that is further from the first cam plate position than the second cam plate position.

7. The transmission device of claim 1, wherein kinetic energy from the vehicle when moving drives the cam plate axially to shift the transmission device.

8. The transmission device of claim 1, further including a transfer mechanism continuously drivingly interconnecting the carrier and the second output shaft.

9. The transmission device of claim 1, wherein the carrier includes a plurality of circumferentially spaced apart lugs drivingly engaged with the cam plate.

10. The transmission device of claim 9, wherein the lugs surround the sleeve.

11. The transmission device of claim 1, further including a plate clutch drivingly interconnecting the input shaft and the second output shaft.

12. The transmission device of claim 11, further including a coil for generating a magnetic field and applying a force to the plate clutch.

13. A multi-speed power transmission device for a vehicle, comprising:
    an input shaft;
    first and second output shafts;
    a planetary gearset including a carrier, a sun gear, a ring gear, and a pinion gear meshed with the sun and ring gears;
    a sleeve moveable to drivingly couple and decouple the sun gear with the input shaft;
    a cam plate axially moveable between first and second positions, the cam plate being continuously fixed for rotation with the carrier and including a helical cam surface that reacts an axial load such that rotation of the cam plate causes axial translation of the cam plate to control the sleeve position, wherein the input shaft drives the first output shaft at a reduced speed via the planetary gearset when the cam plate is at its second position and the sleeve drivingly couples the sun gear to the input shaft.

14. The transmission device of claim 13, wherein the actuator includes a solenoid for translating a cam follower into and out of engagement with the helical cam surface.

15. The transmission device of claim 14, further including another actuator axially offset from the actuator to cause additional axial translation of the cam plate to a third position that is further from the first cam plate position than the second cam plate position.

16. The transmission device of claim 15, wherein kinetic energy from the vehicle drives the cam plate axially when the vehicle is moving to shift the transmission device into and out of the first output shaft reduced speed condition.

17. The transmission device of claim 13, further including a transfer mechanism continuously drivingly interconnecting the carrier and the second output shaft.

18. The transmission device of claim 13, wherein the carrier includes a plurality of circumferentially spaced apart lugs drivingly engaged with the cam plate.

* * * * *